A. R. CARMICHAEL.
AUTOMATIC ATTACHMENT FOR POWER DRIVEN MACHINES.
APPLICATION FILED AUG. 6, 1920.

1,431,723.

Patented Oct. 10, 1922.
4 SHEETS—SHEET 1.

INVENTOR.
ANDREW R. CARMICHAEL.
BY
Lockwood Lockwood
ATTORNEYS.

A. R. CARMICHAEL.
AUTOMATIC ATTACHMENT FOR POWER DRIVEN MACHINES.
APPLICATION FILED AUG. 6, 1920.

1,431,723. Patented Oct. 10, 1922.
4 SHEETS—SHEET 3.

INVENTOR.
ANDREW R. CARMICHAEL.
BY
ATTORNEYS

Patented Oct. 10, 1922.

1,431,723

UNITED STATES PATENT OFFICE.

ANDREW R. CARMICHAEL, OF INDIANAPOLIS, INDIANA, ASSIGNOR OF ONE-THIRD TO JOHN HARVEY PEARSON AND ONE-THIRD TO JOHN J. SCOTT, BOTH OF INDIANAPOLIS, INDIANA.

AUTOMATIC ATTACHMENT FOR POWER-DRIVEN MACHINES.

Application filed August 6, 1920. Serial No. 401,625.

*To all whom it may concern:*

Be it known that I, ANDREW R. CARMICHAEL, a citizen of the United States, and a resident of Indianapolis, county of Marion, and State of Indiana, have invented a certain new and useful Automatic Attachment for Power-Driven Machines; and I do hereby declare that the following is a full, clear, and exact description thereof, reference being had to the accompanying drawings, in which like numerals refer to like parts.

This invention relates to means which may be associated with power driven machines, which machines are manually controlled, whereby the invention automatically actuates and controls the manual controls of the power driven machines so that said machines will automatically perform any desired series of operations.

The chief object of this invention is to provide an attachment for the present manually controlled power driven machines such as lathes, screw machines and the like, whereby the same may be automatically controlled by said attachment after the attachment has been adjusted to the particular machine to which the same has been applied and to the particular work to be performed thereby.

One object of the invention is to make the attachment universally adjustable to the several standard manually controlled power driven machines at present in use by the public.

A further object of the invention is to provide that the attachment is adjustable to the particular work to be performed at any given time by the machine to which the same is attached.

The chief feature of the invention consists in adapting the attachment to standard manually controlled power operated machines without materially changing the construction of the same so that said machines may also be used when desired as manually controlled power driven machines.

Another feature of the invention is that the attachment when properly adjusted permits one operator to watch a plurality of machines, said operator merely renewing the supply or stock to the machines when exhausted thereby and replacing worn out or broken tools.

Another feature of the invention consists in the operating of the power driven machine at maximum speed at all times, whereby eliminating the fatigue element of the manual control, said feature being accomplished by speeding up the several parts upon the non-working strokes of the various parts of the power driven machines.

Another feature of the invention consists in associating and connecting the same to the main power mechanism such that the attachment will automatically stop the attachment and also stop the machines to which the same is applied, whereby said machines may be actuated to receive pieces of work which require work be performed thereon while the same is secured in the machine chuck, said operations being known as "chuck jobs" or "chuck work". The foregoing arrangements permit one operator to position or secure one piece of work in the machine, start the same and pass on to other machines where the same work is repeated, the first machine automatically operating upon the work through a series of operations and stopping as indicated when said operations are completed.

Another feature of the invention consists in providing the attachment with means whereby the same may be manually operated, which permits the operator to adjust to a finer degree of sensibility the various operating cams and associated parts than otherwise would be possible were the attachment to be power driven as is done during the normal operating conditions.

A further feature of the invention consists in associating with the means for disconnecting the power actuation such that the attachment may be manually operated, additional means, which means constitutes a safety device whereby, should for any reason the operating members of the attachment become jammed, said safety device disconnects the operating parts from the power supply.

Still a further feature of the invention is the construction of the attachment such that when attached to turret lathes and the like, wherein a six "gang" turret is provided, said attachment during one operation thereof controls one complete revolution of the turret, such that on a single two tool, three tool or greater tool job, up to and including a six tool job, said attachment respectively completes six, three, two and one complete piece of work for a single revolution of the main actuating part of the attachment.

The particular feature of the invention, when the same is attached to a power driven manually controlled turret lathe or the like, consists in automatically controlling the feeding of the stock, the positioning of the same, the feeding of the material finishing tool, the feeding of the cutting off tool, the feeding of the turret, controlling the movement of the turret, controlling the speed of operating all of the foregoing parts, controlling the speed of the lathe as well as generally controlling all of the mechanical parts of the machine.

The full nature of this invention will be understood from the accompanying drawings and the following description and claims.

This invention relates to means for automatically controlling power driven machines which heretofore have been manually controlled. The invention consists in providing an attachment for machines of the character described, which attachment permits the machine to be operated at its maximum efficiency at all times irrespective of the personal element or fatigue of the operator. In the drawings the invention is illustrated as applied to a six tool turret lathe in which 10 indicates the usual supporting frame, 11 the body, 12 the head stock, 13 the cross head slide, 14 the tool supported thereby, 15 the turret and 16 the turret slide. The turret lathe is driven by means of a pair of reversibly driven pulleys 17 and 18, each of which is provided with the clutch members 19 with which is associated the clutch cone 20 actuated by a handle member 21, whereby the shaft 22 may be driven in either direction or may be held idle, as desired. The shaft 22 is suitably supported as indicated and is provided with a cone pulley 23 in stepped relation. Similarly the lathe is provided with a reversely positioned cone pulley 24, said last mentioned pulley being driven by the first mentioned pulley by means of the belt 25, all of which is of the usual construction.

In the present illustration the lathe is provided with a self centering chuck 26 supported by the head stock 12. The quick acting and self centering chuck 26 is controlled by means of the usual hand lever 27 and by the levers 28. Similarly the lathe is provided with the back gear controlling lever 29. It will be understood that the slide 13 is movable transversely of the axis of the lathe and the base 30 thereof is slidably longitudinally of the axis so that said slide and tool rest 14 may be positioned in the usual manner. The turret slide 16 is normally operated by means of the wheel 31 and is moved longitudinally of the lathe axis. Within the turret construction is suitable mechanism associated with the turret 15 whereby at the end of the rearward movement of the slide 16 upon the base 32, which as shown, may be adjusted in the usual manner upon the slide 33 supported by the body of the machine, said mechanism rotates the turret through the proper angle to position the next succeeding tool in position for the next operation upon the stock 34 engaged or supported by the quick acting chuck 26. All of the foregoing parts comprise the standard turret lathe, and to this lathe or similar machines the invention has been applied.

It will be understood that when the lathe is manually controlled the sequence of operation is as follows. The stock 34 is supplied to the quick acting and self centering chuck 26, and said chuck is opened by means of the lever 27 and links 28 such that the stock, such as a bar or tubular material 34 is positioned therein. The support 32 is positioned adjacent the head stock to provide proper clearance for the cross slide as well as the turret movement. The turret slide 16 is moved upon the body 32 by means of the wheel 31, and the tool 35 is positioned at the end of the movement of the turret slide such that the same abuts the stock 34 to position the stock with respect to the self centering and quick acting chuck so that sufficient stock is exposed for subsequent operations. The turret slide is then withdrawn and in the usual practice, the cross slide 13 supporting the tool post 14 with a suitable tool 36 is moved transversely in the ordinary lathe construction by means of a hand wheel not shown, such that the tool engages the free and forward end of the stock 34 to finish the same as desired. The hand wheel controlling the movement of the slide is then reversed and said tool withdrawn from engagement with the stock. The wheel 31 is then actuated and the tool 37 is positioned in place of the tool 35 and is moved longitudinally of the lathe into engagement with the stock 34. After completing this operation the turret slide 16 is withdrawn and another tool, if necessary or desired, is positioned and moved into engagement with the stock 34. Heretofore turrets have been constructed preferably of five and six tool capacities and the invention is herein illustrated as applied to a six tool turret. Thus for each revolution of the turret 15 a "one tool job" will complete six pieces of work, a "two tool job" will complete three pieces of work, a "three tool job" two pieces of work and a "six tool job" one piece of work. It will also be understood that for a "four and five tool job", two or one of the turret sockets will be blank for the complete operation of the turret, when the same is automatically actuated.

In the present invention the tool post 14 is described as being slidably movable by the removal of the usual hand wheel actuating the cross slide 13 and substituting therefor a rock shaft 38 supported in a bracket 39 positioned upon the body 11 of the lathe. One end of said rock shaft is secured to the slide 13 by a lever 40, while the other end of said said shaft is actuated by means of a lever or bar 41 which in turn is actuated by means of a rod 42. Similarly the self centering chuck control lever 27 is actuated by a link or rod 43. Similarly the back gear lever 29 is actuated by an actuating bar or rod member 44, while the turret slide, manually controlled by means of the wheel 31, is actuated by an upright bracket 45 to which is adjustably secured the rod 46. To the usual turret slide controlling wheel 31 is secured a spring member 47 which takes up considerable lost motion and insures the positive return and retraction of the tool and turret slide 16 as well after the forward movement thereof. Each of the rods 42, 43, 44 and 46 are provided with suitable unions upon their free ends or adjustable buckles 48 to which are secured other actuating rod members which have been indicated by the same numerals, since each pair of rod members and connections constitute a complete actuating means.

The invention consists of means for actuating the rods hereinbefore described in timed relation with each other by means of an attachment, which attachment may be secured to the lathe, if desired, as by means of the brackets 49 or may be independently positioned therefrom. The attachment comprises a main actuating wheel or disk 50 rotatably supported in the frame 51, which is in turn supported by the standards 52. The wheel 50 is rotated, see Figs. 1 and 2, by means of the gear teeth 53 formed upon the external periphery of the wheel. Meshing with the teeth 53, which constitutes a worm wheel, is a worm member 54 suitably secured to a shaft 55 supported in the housing member 56. The shaft 55 cooperates with a driving shaft 57 by means of a slot and pin connection 58, the pin being designated by the numeral 58. The pin 59 may be retracted or withdrawn at pleasure such that the power mechanism associated with the shaft 57 is disconnected from the actuating wheel 50 and said shaft 55 may be rotated by means of the squared end 60 and the usual handle means not shown.

Figures 2, 5, 6:
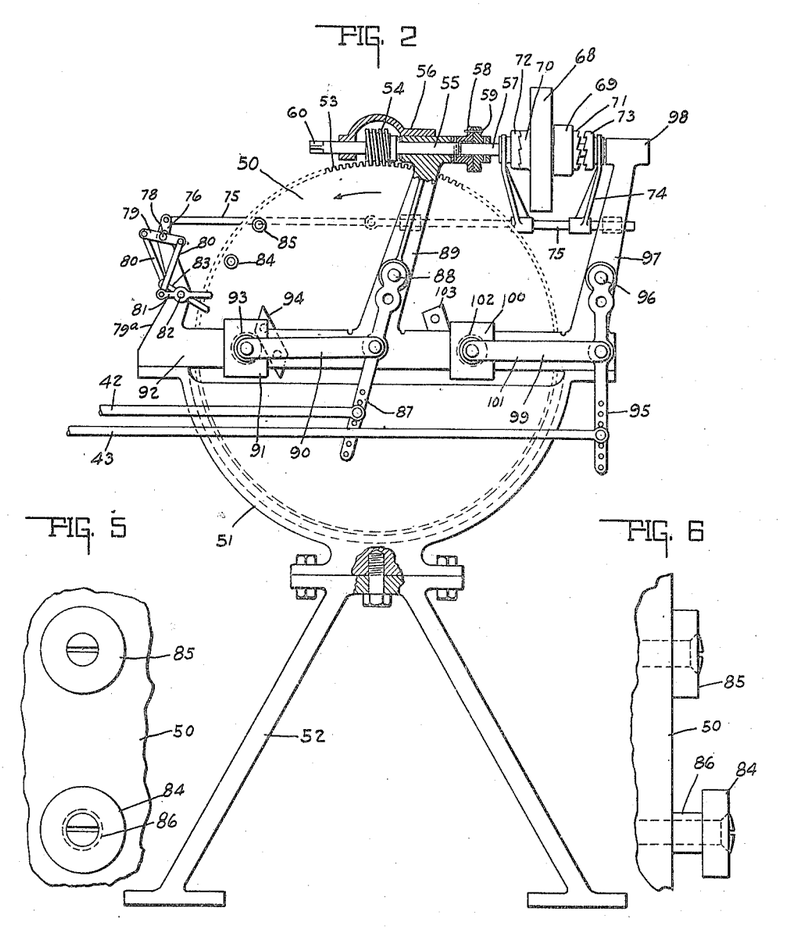
Fig. 2 is an enlarged front view of the invention detached from the turret lathe.
Fig. 5 is an enlarged front view of the variable speed actuating buttons.
Fig. 6 is a side view of the same.

When the pin 59 is associated with the clutch or drive connection 58, as illustrated in Fig. 2, the same is actuated by means of the shaft 57. The means for driving the shaft 57 comprises a cone pulley 61 mounted upon the shaft 62. Associated with the pulley 61 and shaft 62 is the clutch dog 63 and clutch cone 64 shiftable by means of the clutch rod 65 into and out of operative position. The shaft 62 is thus rotated by means of the clutch connection described and upon said shaft is secured a pair of different sized pulleys 66 and 67 respectively. The belt means 68$^a$ connects the pulleys 66 and 67 with the pulleys 68 and 69 respectively, said pulleys being rotatable upon the shaft 57. Each of the pulleys 68 and 69 is provided with a suitable clutch face 70 and 71 respectively. Associated with each of the clutch faces 70 and 71 are the clutch faces 72 and 73 respectively, said clutch faces being slidable upon the shaft 57 and being rotatable therewith by being keyed or otherwise suitably secured thereto. Each of the clutch faces 72 and 73 is provided with a shifting bracket 74 suitably secured to a shifting rod 75. The rod 75 is actuated by means hereinafter to be described in detail which is associated with the main actuating wheel 50. Therefore, said wheel controls its own rotating movement. It will be thus understood that when the clutch face 72 is associated with the clutch face 70, power is applied from the cone pulley 61 through which the pulley 68 and the worm 54 will be rotated at, what may be termed, the slow speed. Similarly when power is transmitted from the pulley 61 to the pulley 69 and thence to the shaft 57 through the clutch faces 71 and 73, the worm 54 will be rotated at a greater speed.

The rod 75 is provided with means for shifting the clutch faces 72 and 73 into either of the fast or slow driving positions or to the neutral position. The means for shifting the rod 75 to the two first mentioned positions comprise, see Figs. 1, 2 and 3, a pivoted lever 76, one end of which is secured to the rod 75 and the other end of which is associated with a spring mechanism 77, said lever being pivoted intermediate its end at 78 to a bracket 79$^a$ secured to the supporting frame in any suitable manner. The pivot 78 comprises a rock shaft and upon the other end thereof is positioned a lever 79, which lever is secured to said shaft intermediate its ends. To each of the ends of the lever 79 is secured a link member 80. One link member 80 is connected at its opposite end to a tripping lever 81 pivoted operatively upon the bracket 79ª at 82. Similarly the other link member 80 is pivoted at one end to a tripping lever 83, said lever being pivoted intermediate its ends upon the pivot 82. It will be understood that the levers 81 and 83 project inwardly towards the actuating wheel 50 and are positioned adjacent said wheel, the lever 83 lying close to the wheel and the lever 81 being positioned adjacent the lever 83. Suitable means are associated with the tripping levers 81 and 83, whereby the rod 75 may be actuated from one position to the other such that the wheel 50 will be rotated at either speed in the direction of the arrows as indicated in Fig. 2. As shown in Figs. 5 and 6, the means for tripping the levers 81 and 83 comprise the buttons 84 and 85 respectively.

Figures 3, 7, 8:
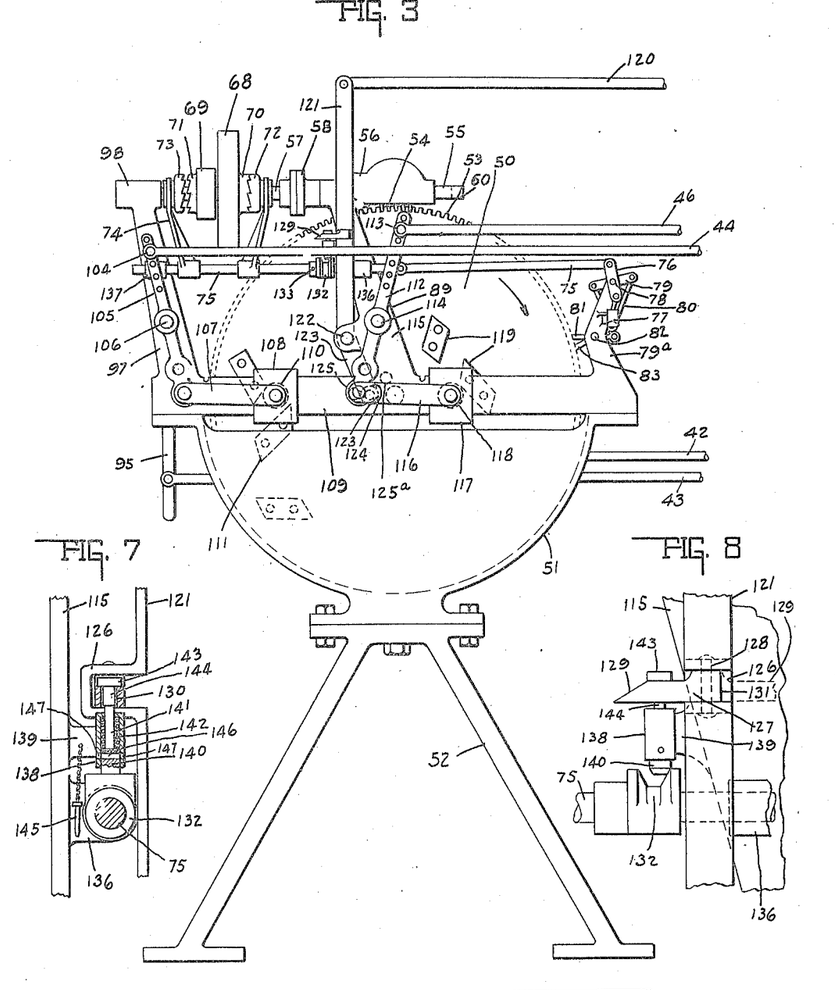
Fig. 3 is an enlarged rear view of the same.
Fig. 7 is a sectional view of one feature of the invention when used in connection with the "chucking" operation, said section illustrating the means for stopping the lathe.
Fig. 8 is a front view of the same showing the parts as illustrated in Fig. 3.

The buttons 84 and 85 are dissimilar and project from the face of the wheel 50, as shown in Fig. 6. Thus the button 85 is of substantially one half the height of the button 84 and is adapted therefor only to actuate the lever 83. The button 84 is provided with a cut-away portion 86, which cutaway portion permits the free end of the tripping lever 83 to pass the same without interference. The lever 84 therefore is adapted to engage the outermost tripping lever 81 and actuate the same. It will be understood that the spring means 77 illustrated in Fig. 7 is adapted to tilt the levers 79 and 76 from the neutral or central position into one or the other of the actuating positions. Thus the pin 84 or 85 tilts the respective lever to actuate the rod 75 and the spring means 77 carries the mechanism over center so that the other tripping lever is positioned for subsequent operation.

The means for actuating the several rod members 42, 43, 44 and 46 comprise suitable means positioned upon the main actuating wheel and other means associated therewith and actuated thereby, said other means including means for providing a reciprocatory motion, which reciprocatory motion is transmitted to the rod members to reciprocate the same and actuate the several lathe mechanisms associated with said rod members 42, 43, 44 and 46. Reference will now be had in particular to Figs. 2 and 3. The rod 42 is adjustably secured at its free end to a lever 87, which lever is pivoted at 88 to a bracket 89 suitably secured to and forming a part of the frame of the attachment. In the present instance the bracket 89 is continued upwardly and supports the housing member 56. The rod member 42 is secured to the lever 87 in any one of the adjusted positions, as illustrated. Intermediate the pivot 88 and connecting the rod 42, is secured a connecting rod 90 to which is pivoted a block 91 reciprocatorily mounted upon a slide 92. The slide 92 in the present instance is shown formed integral with and forms a part of the frame rotatably supporting the main actuating wheel. Upon the inner face of the slidable block 91 is rotatably supported a suitable cam roller or follower 93, shown dotted in Fig. 2, which roller is actuated by suitable cam means 94 positioned upon the main actuating wheel 50. Thus the cam members or cam means 94 reciprocate the slidable block 91, which in turn reciprocates the rod 42 to move the cross slide 13 transversely of the machine and into and out of engagement with the work 34. As shown clearly in Fig. 2, the wheel 50 is rotated at the slow speed through the worm 54. By means of a button 84, when the same is moved into engagement with the lever 81, the wheel will be rotated at an increased speed and at the same time the cam means 94 will have moved the roller outwardly and radially from the center of the wheel, thereby moving the rod 42 towards the left of the lathe thereby actuating the slide 13 and moving the tool 14 transversely of the work and lathe. The wheel is rotated at high speed until the button 85 is positioned adjacent the tripping levers 83 whereupon the speed of rotation is again changed by said button 85 to the slow speed condition.

Similar to the foregoing construction, the rod 43, which controls the self centering and quick acting chuck 26 is adjustably secured to the lever 95. One end of the lever 95 is pivoted at 96 to a supporting bracket 97 which, in the present instance, extends upwardly and forms a bearing 98 for one end of the shaft 57. Intermediate the pivot connection 96 and the connection with the rod 43 there is pivoted one end of the connecting rod 99, the other end of which is pivoted to a block 100 which block is slidable upon suitable slide 101 which, in the present instance, is formed similar to the slide 92. The block 100 is also similar to the block 91 and is similarly provided with a cam follower 102, which cam follower is actuated by a series of cams or cam means 103 which cam means may be associated with the faces 84 and 85 similar to the cam means 94 hereinbefore described, whereby said parts all are actuated in timed relation with each other.

Upon the opposite side of the main actuating wheel 50 is positioned the back gear control rod 44, said rod terminating at 104 and being adjustably secured to one end of the pivoted lever 105, which lever is pivoted intermediate its ends at 106 to the upwardly projecting bracket 97. The other end of the lever 105 is connected to a connecting rod 107 which rod is pivoted to a block 108 slidably mounted upon a slide 109, said slide 109 being preferably formed integral with the means rotatably supporting the master wheel 50. On the block 108 is secured the cam roller or follower 110 which roller is actuated by suitable cam means 111 positioned upon the plate 50.

The turret slide control rod 46 is adjustably connected to a lever 112 at 113, said lever being pivoted intermediate its ends at 114 to a bracket 115 substantially similar to the bracket 89. The other end of the lever 112 is connected to a connecting rod 116 in turn connected to a slidable block member 117, which block member carries upon its inner face substantially similar to the previous mentioned slidable block members, a roller or cam follower 118 which is adapted to be actuated by the cam means 119 secured upon the face of the revolving plate 50.

Figure 4:
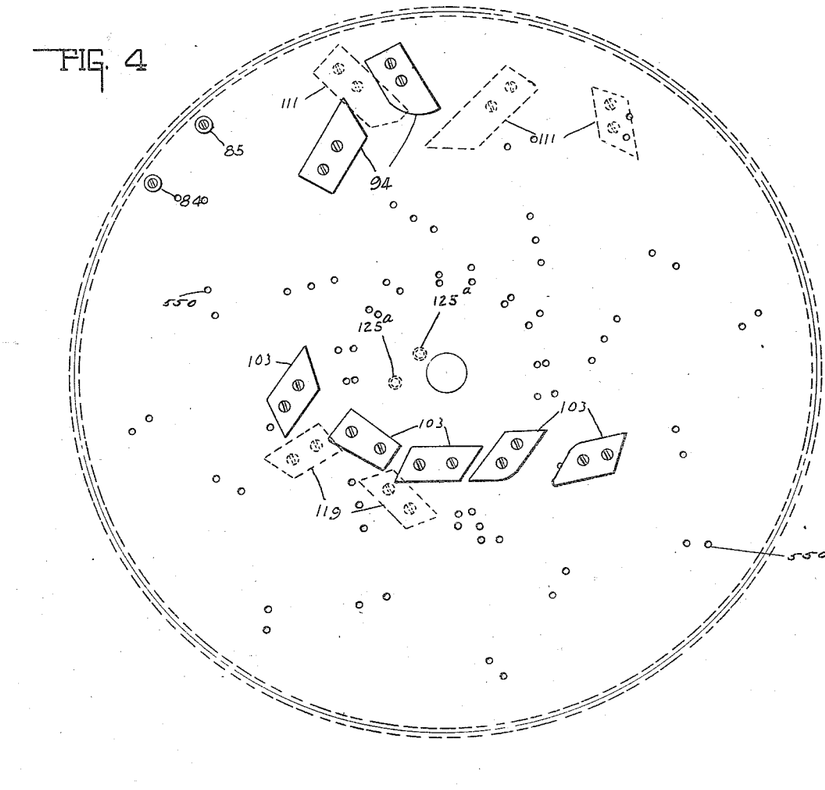
Fig. 4 is an enlarged front view of the main control or actuating member of the invention.

While the cam means associated with the rod members 42, 43, 44 and 45 for actuating the same are shown in the several figures and in particular in Fig. 4, as comprising a plurality of cam surfaces, said cam means may consist of suitable channels adapted to receive by the several cam rollers. Preferably, however, the cam means are composed of several parts such that the same may be adjusted relative to the plate member and to each other. For this purpose the plate or main actuating wheel 50 is provided with a plurality of concentric series of holes 550 in which the various cam blanks may be adjustably secured. It will, of course, be understood that since the turret lathe to which this invention has been applied consists of a six tool turret, said wheel necessarily is divided into at least six central angles each of which constitutes a period of operation coinciding with the period corresponding to one of said turret tool positions. Thus with a two tool turret piece of work or a three tool piece of work, the cycle of camming necessarily will be triplicated or duplicated respectively upon both faces.

In order to insure that the lathe in the present instance or the machine to which the invention is applied, will operate at maximum efficiency consistent with the capacity of the machine the speed of the master wheel is regulated so that at certain periods of operation said wheel is rotated faster than at other periods during a complete revolution. It will be remembered that the pins 84 and 85 are positioned upon the periphery of the master wheel 50 so as to trip the tripping levers 81 and 83. It will, therefore, be understood that when a plurality of said pins is pivoted upon the periphery of said master wheel, as shown in the drawings and in particular Fig. 4, said master wheel, during the various periods comprising one revolution, may be intermittently actuated at either the slow or fast speed. Thus the tool which is to operate upon the work is the determining factor which governs the speed at the particular instant. Also, while the turret tool is being withdrawn, after said tool has been disengaged from the work, the cross slide may be actuated simultaneously therewith to position the outer forming tool or cutting-off tool ready for the forming or cutting-off work. Both of these operations can be simultaneously executed at the high speed thereby increasing the efficiency of the lathe. It will, of course, be understood that if necessary the actual forming or cutting-off movement upon the stock may be executed at slow speed.

With the foregoing arrangement of the parts it will be understood that the sequence of operations is as follows. The self centering chuck is actuated to release and feed the stock into the lathe and simultaneously therewith the turret is actuated to position the stop tool adjacent the stock and thereby limit the forward movement of the same. During the clamping operation of the self centering chuck the turret is retracted at high speed from its position adjacent the work and at the end of said stroke said turret is rotated by the mechanism internal to the turret, thereby positioning the next tool in position. Simultaneously with the retraction of the turret hereinbefore mentioned, the cross slide may be actuated and the exterior surface of the stock machined. The cross slide and machining tool is then retracted and, if desired, simultaneously therewith the second mentioned tool in the turret is brought up into engagement with the work, both of these movements being executed at what is known as high speed, since no work is being performed upon the stock. The turret tool then operates upon the work and, if necessary, at the slow speed, said tool after finishing this operation, such as for instance drilling, is retracted at high speed and another tool such as a reamer may be positioned also at high speed adjacent the work and may operate upon the stock at slow speed if necessary. If the reaming constitutes the last operation upon the stock said turret may be retracted at high speed and simultaneously therewith the cross slide may be moved transversely of the stock and lathe (also at high speed) until the cutting off tool is positioned adjacent the work and, if necessary, said tool may be projected into and upon the work at slow speed until the completed work is severed from the stock. The cutting-off tool is then retracted at high speed and simultaneously therewith the stop tool, hereinbefore described as the first step in the cycle, may be brought up adjacent the self centering chuck whereupon when the stock is fed through and by said chuck, the cycle is again completed.

From the foregoing it will be understood that after the cams have been adjusted to the various operations to be performed, said machine automatically controls the operation of the lathe or other similar machine to which the invention has been applied such that no further attention is required to operate said machine or lathe at its maximum efficiency, except to insure that sufficient stock is supplied to the self centering chuck and that the several tools which actually perform the work are maintained in the proper condition.

It will be understood that after the tools have been adjusted and the timing thereof adjusted, by means of the plurality of concentric holes adapted to receive the several cam means hereinbefore described, said attachment machine will be infallible in its operation so far as its operation is concerned, but it will be understood that should for any reason any mishap or accident occur to the tools associated with the lathe or in the lathe itself, the invention will still continue to operate except as now noted. If any portion of the lathe should refuse to function or any of the tools become "jammed," either with respect to the tools or with respect to the work, said "jamming" will automatically, see Fig. 2, shear the pin 59, whereby the shaft 57 will continue to rotate without rotating the shaft 55 and, therefore, the wheel 50 will remain idle.

Another feature of the invention associated with the pin 59 and the notched shaft end 60 hereinbefore described, is that the master wheel 50 may be manually rotated at any desired speed which permits the operator to adjust the camming of the attachment more accurately than would be possible were the same to be power driven during the starting up or adjusting period.

In certain work it is necessary to take certain pieces of work which previously have been operated upon as described and position the same in the chuck and then continue to operate upon the work positioned in the chuck. This class of work is technically known as "chuck work" and by means hereinafter to be described this machine makes it possible to automatically operate upon such classes of work with a minimum amount of manual control.

This semi or substantially entire automatic control, it will be understood, requires that the lathe or machine to which the attachment is being applied be stopped and that the attachment or master wheel 50 also be stopped at a predetermined point in the cycle of operations. To insure that the attachment and lathe will be substantially automatic in its operation it will, of course, be understood that it is necessary to simultaneously actuate the lathe and the attachmen. When the attachment is thus used with the lathe it will be understood that the rod 43 is disassociated from the lever 27 so that the chuck 26 or an equivalent chuck may be manually operated by the operator to receive the work as indicated.

The means for automatically stopping the lathe and attachment when the work in the chuck has been finished, and for automatically starting said attachment and said lathe after a piece of work has been manually positioned within the chuck is as follows. It will be remembered that the handle 21 controls the power supplied to the lathe. Secured to the handle 21 is a horizontal bar 120. The other end of the horizontal bar 120 is connected to one end of the lever 121, said parts as shown in Fig. 3 being illustrated in the forward driving position only when the clutch member 20 is in engagement with the dogs 19, whereby the pulley 18 may rotate the shaft 22, see Fig. 1.

Figure 1:
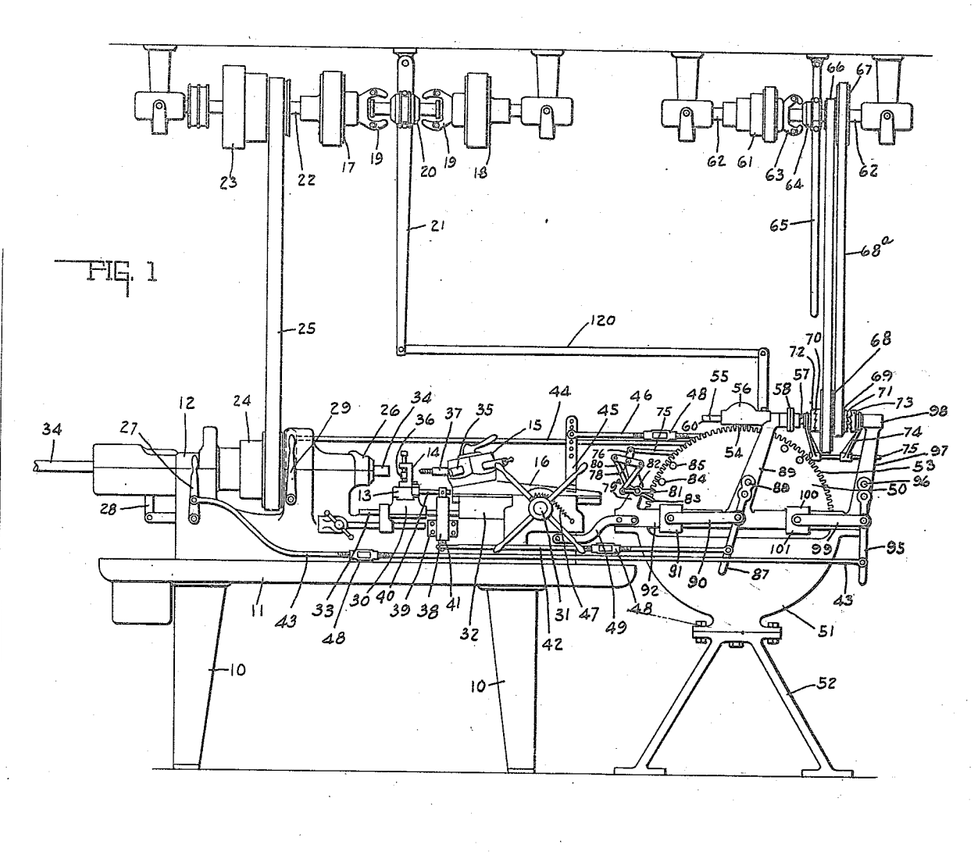
Fig. 1 is a front elevational view of a turret lathe to which the invention has been attached.

The parts are shown in Fig. 1 to be in neutral position, while the same parts are shown in Fig. 3 in the forward driving position. The lever 121 is pivoted at 122 to a bracket formed upon the upwardly extending bracket 115, and said lever upon its other end 123 is provided with a cam roller 124, said roller being actuated by suitable cam means 125. Midway between its upper end and the pivot 122 is formed an offset portion 126, which offset portion is adapted to receive an elongated dog or latch 127, said dog being pivoted, as shown in Fig. 8, by means of the pin 128 and terminating in a tapered face 129 which face and elongated body portion is slotted as at 130 for a purpose hereinafter to be described. It will be understood that when the edge 131 is arcuately formed thereby permitting the latch 127, when desired, to be rotated 180 degrees into the nonactuating position. When thus positioned the device hereinafter to be described is rendered inoperative and it will be understood that the cam means 125 associated with the lever is also removed from the main actuating wheel 50.

The means associated with the elevating dog or latch 127 is shown clearly in Figs. 3, 7 and 8. A collar member 132 is secured to the rod 75 by suitable means, such as a set screw 133. The rod 75 is shown clearly in Figs. 3 and 7 as slidably supported in the brackets 136 and 137 formed upon the upwardly extending brackets 115 and 97 respectively. Positioned above the collar 132 and adjacent the lever 121 and beneath the angular portion 126 is a cylinder 138 supported upon the bracket 115 by the portion 139. Within the cylinder 138 is a plunger or pin member 140 suitably cut away at 141 to receive and seat a spring member 142, which spring member normally forces the plunger 140 downwardly and into engagement with the collar 132 to lock said collar beneath the cylinder 138 and lock the clutch members 72 and 73 in the neutral position. The pin member 141 extends upwardly over the cylinder 138 and is provided with a head portion 143, which head portion and body portion 144 is adapted to be associated with the tapered and slotted tooth 127 so that when the parts are in the forward driving position as illustrated in Fig. 3 and the master wheel is rotated slowly, said tooth maintains the pin member 140 out of engagement with the collar 132. The bar 120 is moved to the neutral position, illustrated in Fig. 1, by the lever 121 pivoted at 122, which is moved to the right of said figure to release the pin member 140 to the action of the spring 142 so that said pin member is adapted to engage in the groove 132, and due to the action of the spring 77, shift the rod 75 to the neutral position. If the clutch 73 were driving, the parts would be positioned substantially similar to that shown in Fig. 3 except that the collar 132 would be positioned to the right of the pin 140 instead of to the left, as illustrated, and when said pin was released said collar would be moved from the right of the pin to beneath the pin instead of as shown in Fig. 3 from the left of the pin to beneath the pin. A pin member 145 associated with the plunger 140 and cylinder 138 is adapted to maintain and lock the plunger in the non-seating position when the latch 127 is moved to the non-actuating position by being seatable in the registrable openings 146 and 147 respectively. It will be understood that the lever 121 is actuated by the cam means 125 and roller 124 to automatically stop both the lathe and the attachment simultaneously when the work has been completed, and the lathe or similar machine is then adapted to receive another piece of work.

It will be understood that the bar 120 is manually actuated after a piece of work has been positioned in the chuck 26 and when so positioned said tooth 127 engages the pin 140 and elevates the same from the collar 132, whereupon said rod 75 is released to the action of the spring member 77 and the clutch hereinbefore in engagement is again returned to engagement such that the attachment again is rotated and the lathe is likewise rotated and controlled.

While the cam member 125 has been described as of just sufficient size to move the lever 121 to the neutral position, it will be understood that a plurality of suitably sized cam buttons 125ª, see Fig. 4, may be used to actuate the follower 124 and the lever 121. In this arrangement it will be understood that the latch 127 is maintained in the non-actuating position and the plunger 140 is maintained by the pin locking member 145 in the elevated position. The cam means 125ª is thus adapted to shift the lever 121 from the forward driving position in the reverse driving position. This feature of the reverse driving of the lathe is essential when a piece of work has to be "tapped" out or cut with a die to provide either an internal or external thread thereon. The attachment, of course, continues to be actuated during the foregoing operation.

While the invention has been described in great detail many modifications thereof will suggest themselves to those skilled in the art, and the invention is not to be limited by the foregoing detailed description, but reference is to be had to the appended claims.

The invention claimed is:

1. An automatic machine for mechanically operating a machine having a manually operable stock feeding control and a manually operable stock positioning control, including means for mechanically controlling the manually operable stock feeding control, and other means for mechanically controlling the manually operable stock positioning control, and a single means operating both of said mechanically controlling means in timed relation.

2. An automatic machine for mechanically operating a turret machine having a manually operable stock supplying control, and a manually operable turret indexing control, said automatic machine including means for mechanically controlling the manually operable stock control, mechanism for mechanically controlling the turret control, and a single means which operates said first mentioned means and said mechanism in timed relation.

3. In an automatic machine for mechanically operating a turret machine having a manually operable stock supplying control, and a manually operable stock severing control, the combination of means for mechanically controlling the stock supplying control, means for mechanically controlling the manually operable stock severing control, and a single means operating both of said mechanically controlling means in timed relation.

4. In an automatic machine for mechanically operating a turret machine having a manually operable stock supplying control, a manually operable turret control, and a manually operable stock severing control, the combination of means for mechanically controlling the manually operable stock supplying control, other means for mechanically controlling the manually operable turret control, a third means for controlling the manually operable stock severing control, and a single means operating all of said mechanically controlling means in timed relation.

5. In an automatic machine for mechanically operating a power driven machine having manual controlling means, the combination of an actuating plate rotatably mounted, means for rotating said plate, and means operable by said actuating plate and associated with the manual controlling means of said power driven machine for mechanically operating and controlling the latter.

6. In an automatic machine for mechanically operating a power driven machine having manual controlling means, the combination of an actuating plate rotatably mounted, means for rotating said plate, means operable by said actuating plate and associated with the manual controlling means of said power driven machine for mechanically operating and controlling the latter, and means associated with said plate and said rotating means for varying the relative speed of said plate.

7. In an automatic machine for mechanically operating a power driven machine having manual controlling means, the combination of an actuating plate rotatably mounted, means for rotating said plate, means operable by said actuating plate and associated with the manual controlling means of said power driven machine for mechanically operating and controlling the latter, means associated with said plate and said rotating means for varying the relative speed of said plate, and adjustable means associated with said plate for actuating said speed varying means.

8. In an automatic machine for mechanically operating a power driven machine having manual controlling means, the combination of an actuating plate rotatably mounted, power means for rotating said plate, means operable by said actuating plate and associated with the manual controlling means of said power driven machine for mechanically operating and controlling the latter, and safety means interposed between said plate and said power driven means, whereby said power driven means may be disconnected from said plate.

9. In a machine, the combination of an actuating plate rotatably mounted, gear means for rotating said plate, power means associated with said gear means for rotating the same, detachable means connecting said power means and said gear means, and means associated with said gear means whereby the plate may be manually rotated.

10. In a machine, the combination of an actuating plate rotatably mounted, means for rotating said plate and means for varying the rotational speed of said plate, said means comprising a pivoted bar means, clutch means operable by said bar means, actuating means on said plate, and lever means actuated by said plate supported actuating means for actuating said bar means.

11. In a machine, the combination of an actuating plate rotatably mounted, means for rotating said plate, and means for varying the rotational speed of said plate, said means comprising a pair of clutch members, rod means associated with said clutches, a pair of levers associated with said rod means, and means for alternately actuating said lever means successively.

12. In a machine, the combination of an actuating plate, and means for varying the rotational speed of said plate, said means comprising a pair of clutch members, rod means associated with said clutches, a pair of levers associated with said rod means, and a plurality of tripping means positioned upon said actuating plate for tripping said levers alternately.

13. In a machine, the combination of an actuating plate rotatably mounted, means for rotating said plate, and means for varying the rotational speed of said plate, said means comprising a pair of clutch members, rod means associated with said clutches, a pair of levers associated with said rod means, means for alternately actuating said levers successively, and spring means associated with said levers for carrying the same over dead center.

14. In a machine, the combination of an actuating plate, and means for varying the rotational speed of said plate, said means comprising a pair of clutch members, rod means associated with said clutches, a pair of levers associated with said rod means, a plurality of tripping means positioned upon said actuating plate for tripping said levers alternately, and spring means associated with said levers for carrying the same over dead center.

15. An attachment for manually controlled power driven machines including mechanical means for actuating the manual controlling means, and power means for automatically actuating said mechanical controlling means.

16. An attachment for manually controlled power driven machines including mechanical means for actuating the manual controlling means, means for automatically actuating said mechanical manual controlling means in timed relation, and power means for actuating said automatic time actuating means.

17. An attachment for manually controlled power driven machines including mechanical means for actuating the manual controlling means, means for automatically actuating said mechanical manual controlling means in timed relation, power means for actuating said automatic time actuating means, and means for increasing the speed of the several manually controlled means during the idle or non-working operations.

18. An attachment for manually controlled power driven machines including mechanical means for actuating the manual controlling means, means for automatically actuating said mechanical manual controlling means in timed relation, power means for actuating said automatic time actuating means, and adjustable means for automatically increasing the speed of the manually controlled means.

19. In an attachment for automatically and mechanically operating a manually controlled power driven machine the combination of a rotatable actuating plate, cam means on said plate, cam follower means operable by said cam means in the rotation of said plate, means slidably mounted adjacent said plate for supporting said cam follower means, and means reciprocated by said slidably mounted means.

20. In an attachment for automatically and mechanically operating a manually controlled power driven machine, the combination of a rotatable actuating plate, cam means adjustably mounted on said plate, cam follower means operable by said cam means in the rotation of said plate, and means slidably mounted adjacent said plate for supporting said cam follower means, and means reciprocated by said slidably mounted means.

21. In an attachment for automatically and mechanically operating a manually controlled power driven machine, the combination of a rotatable actuating plate, a plurality of cam surfaces on said plate, a cam follower for each of said cam means and operable by the same in the rotation of said plate, and a plurality of slidably mounted means associated with said cam follower means and operable thereby.

22. In an attachment for automatically and mechanically operating a manually controlled power driven machine, the combination of a rotatable actuating plate, a plurality of cam surfaces adjustbly mounted on said plate, a cam follower for each of said cam means and operable by the same in the rotation of said plate, and a plurality of slidably mounted means associated with said cam follower means and operable thereby, said cam means being positioned in spaced relation with each other and the center of said rotating plate.

23. In an attachment for automatically and mechanically operating a manually controlled power driven machine, the combination of a rotatable actuating plate, a plurality of cam surfaces adjustably mounted on said plate, a cam follower for each of said cam means and operable by the same in the rotation of said plate, and a plurality of slidably mounted means associated with said cam follower means and operable thereby, said cam means being positioned upon opposite sides of said plate.

24. In an attachment for automatically and mechanically operating a manually controlled power driven machine, the combination of a rotatable actuating plate, a plurality of cam faces on each face of said rotating plate, cam follower means operable by each of said cam means in the rotation of the plate, and slidable means for each of said cam follower means and operable by the same, the cam means on the same side of the plate being in spaced relation with each other and the center of said actuating plate.

25. In an attachment for automatically and mechanically operating a manually controlled power driven machine, the combination of a rotatable actuating plate, a plurality of cam faces on each face of said rotating plate, cam follower means operable by each of said cam means in the rotation of the plate, and slidable means for each of said cam follower means and operable by the same, the cam means on the same side of the plate being in spaced relation with each other and the center of said actuating plate, each of said cam means being adjustably mounted on said plate.

26. In an attachment for automatically operating a manually controlled power driven machine, the combination of a supporting base, an actuating plate, bracket means rotatably supporting said actuating plate, a slide member slidably supported upon said bracket, cam means on said plate, and a cam follower supported upon said slide and actuated by said cam means for reciprocating the slide upon the bracket.

27. In an automatic machine for mechanically operating a power driven machine having manual controls, the combination of a rotatably mounted plate member provided with a plurality of series of holes concentrically arranged, and actuating means adjustably secured in said holes for mechanically operating the manual controls of the power driven machine.

28. The combination of a power driven machine having manual controls and a power driven mechanically operated machine which mechanically operates the manual controls of the power driven machine.

29. The combination of a power driven machine having manual controls, a power driven mechanically operated machine for mechanically operating the manual controls of said first mentioned power driven machine, and means operable by said second mentioned power driven machine for automatically disconnecting the power from both of said machines.

30. The combination of a machine, power means for driving said machine, an attachment for controlling said machine, power means for actuating said attachment, clutch means associating said last mentioned power means with said attachment, clutch means associating said first mentioned power means with said machine, and means operable by said attachment for disassociating both of said clutch means from said power means.

31. The combination of a machine, power means for driving said machine, an attachment for controlling said machine, power means for actuating said attachment, clutch means associating said last mentioned power means with said attachment, clutch means associating said first mentioned power means with said machine, means operable by said attachment for disassociating both of said clutch means from said power means, said last mentioned means comprising a pivoted lever, cam means associated with said attachment for actuating said lever, and means associated with each of said clutch means and said lever whereby the same will automatically disconnect both of said clutch means from said power means.

32. The combination of a power driven lathe, an attachment for controlling the operations of said lathe, power means for operating said attachment, clutch means associated with said power means, a pivoted lever tiltable by said attachment, a tooth secured to said lever and movable therewith, cam means associated with said clutch means for moving the same to the non-driving position, and means for actuating said cam when released from engagement with said tooth by the tilting of said lever.

33. The combination of a power driven lathe, an attachment for controlling the operations of said lathe, power means for operating said attachment, clutch means associated with said power means, a pivoted lever tiltable by said attachment, a tooth pivotally supported upon said lever so as to be movable into the non-cam engaging position, cam means associated with said clutch means for moving the same to the non-driving position, and means for actuating said cam when released from engagement with said tooth by the tilting of said lever.

34. In an automatic machine for mechanically operating a power driven lathe having a manually operable cutting off mechanism and forming mechanism movable into cutting off, neutral and forming positions and manually operable means controlling the feeding of the stock, the combination of means for mechanically controlling the manual stock feeding means, other means for mechanically controlling the manually positioned means of the actuating and forming mechanism, and a single means for operating both of said last mentioned means in timed relation.

35. In an automatic machine for mechanically operating a power driven turret lathe having a manually operable cutting off mechanism and forming mechanism movable into cutting off, neutral and forming positions, and manually operable controlling mechanism for the turret, the combination of means for mechanically controlling the manually positioned means of the actuating and forming mechanism, other means for mechanically controlling the manually operable turret controlling mechanism, and a single means for operating both of said mechanical means in timed relation.

36. In an automatic machine for mechanically operating a power driven turret lathe having a manually operable cutting off mechanism and forming mechanism movable into cutting off, neutral and forming positions, manually operable controlling mechanism for the turret and manually operable means controlling the feeding of the stock, the combination of means for mechanically controlling the manual stock feeding means, other means for mechanically controlling the turret control, a third means for manually controlling the stock feeding means, and a single means for operating all of said mechanical means in timed relation.

37. The combination of a power driven lathe having a manually operable reversible driving control, and a power driven machine for automatically and mechanically operating said driving control.

38. The combination of a power driven lathe having a manually operable back gear control, and a power driven machine for automatically and mechanically operating said control.

39. The combination of a power driven lathe having a manually operable back gear control, and a manually operable reversible driving control, and a power driven machine for automatically and mechanically operating said control.

40. An automatic machine for mechanically operating a turret machine having a manually operable stock control, and a manually operable turret feed control, said automatic machine including means for mechanically controlling the manually operable stock control, mechanism for mechanically controlling the turret control, and a single means which operates said first mentioned means and said mechanism in timed relation.

41. An automatic machine for mechanically operating a turret machine having a manually operable stock supplying control, and a manually operable turret indexing and feeding control, said automatic machine including means for mechanically controlling the manually operable stock control, mechanism for mechanically controlling the index and feeding control, and a single means which operates said first mentioned means and said mechanism in timed relation.

In witness whereof, I have hereunto affixed my signature.

ANDREW R. CARMICHAEL.